Oct. 14, 1930.  A. G. McKEE  1,778,426
GAS SCRUBBER
Filed March 15, 1926  4 Sheets-Sheet 3

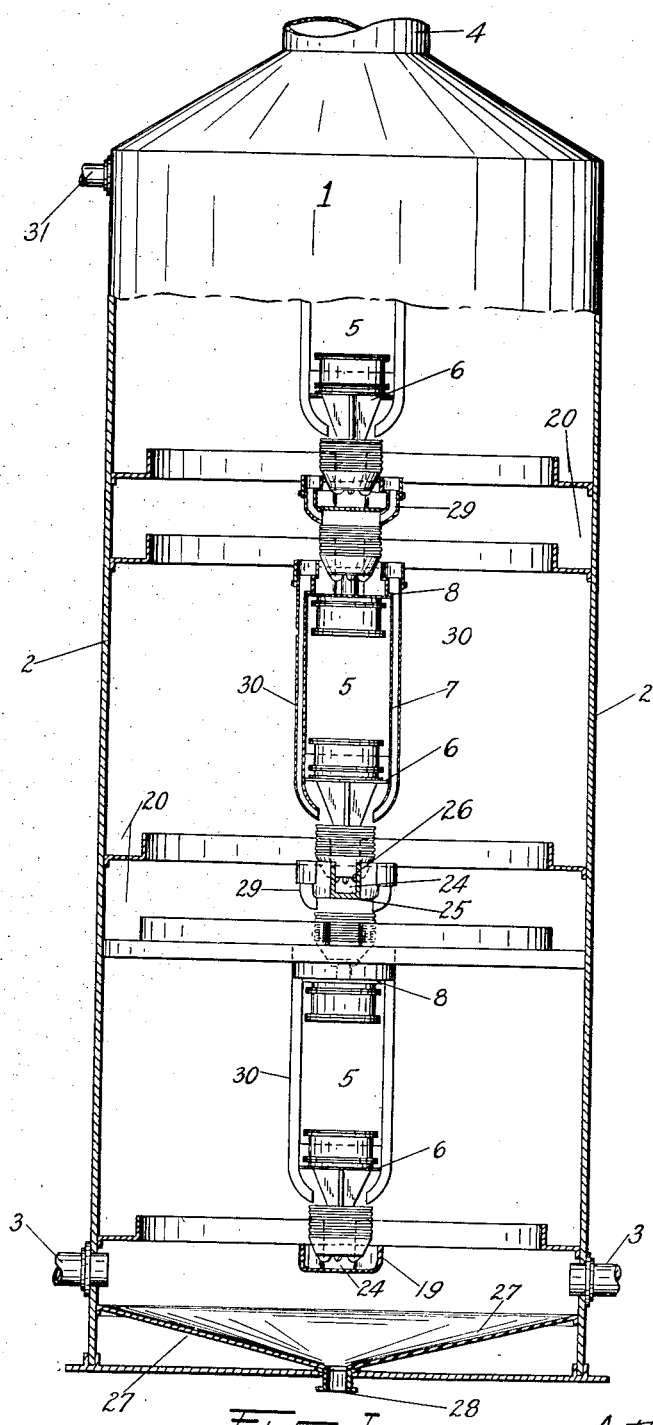

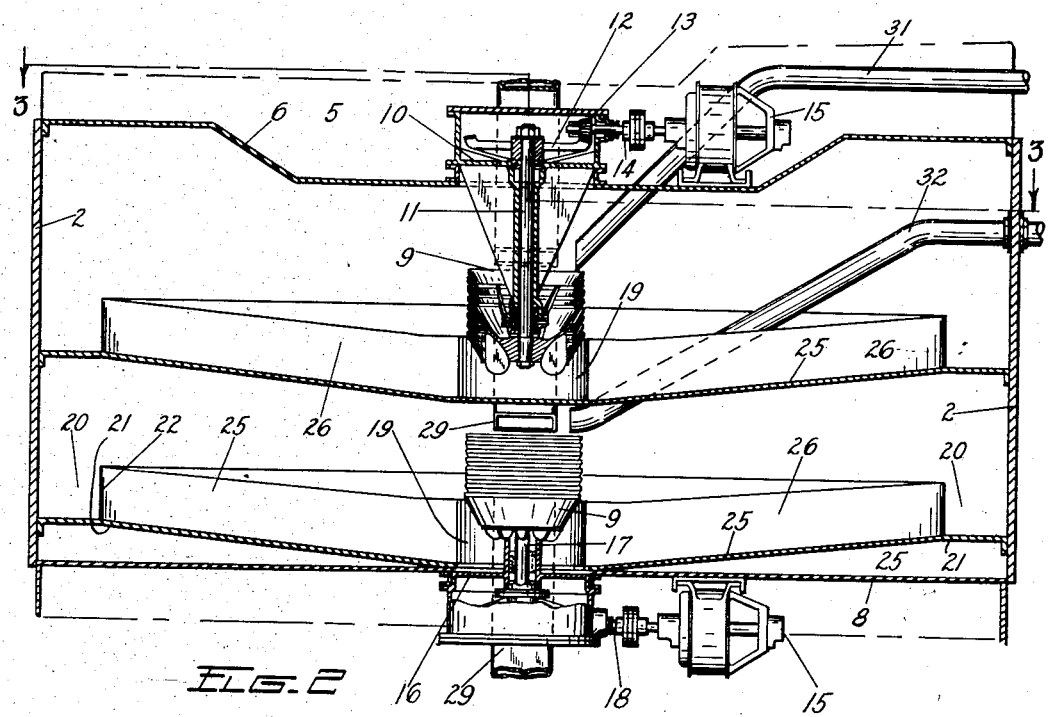
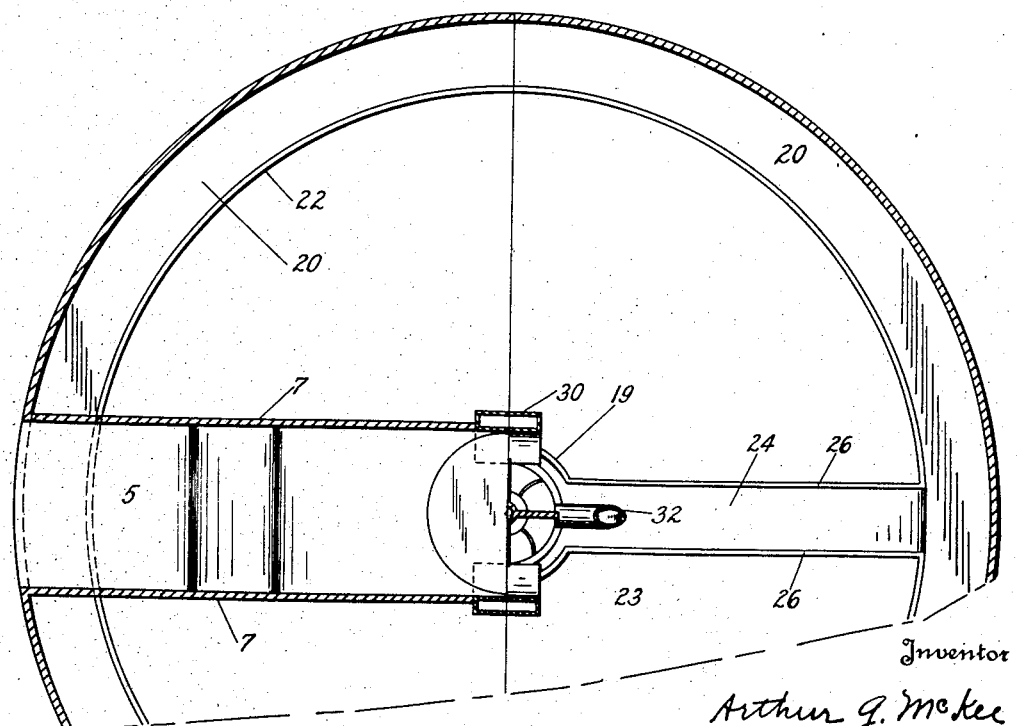

Inventor
Arthur G. McKee
By Richey & Watts
Attorneys

Oct. 14, 1930.    A. G. McKEE    1,778,426
GAS SCRUBBER
Filed March 15, 1926    4 Sheets-Sheet 4
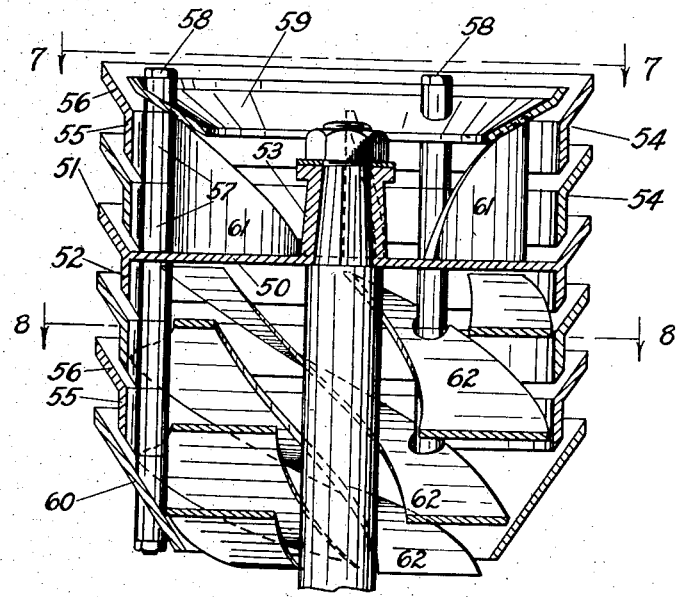
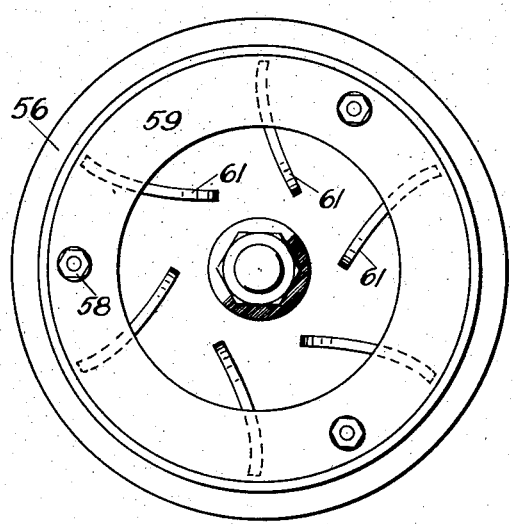
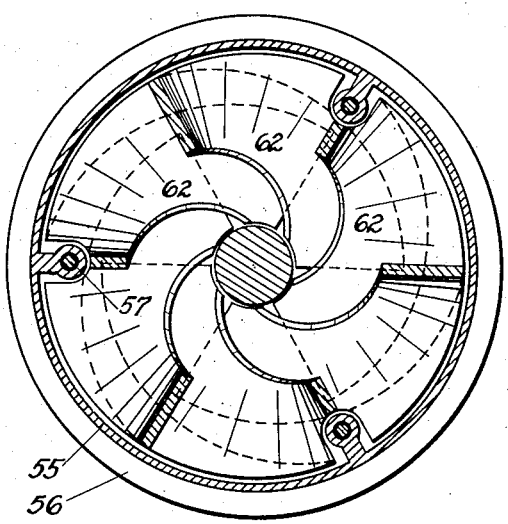
Inventor
Arthur G. McKee
By Richey & Watts
Attorneys Patented Oct. 14, 1930

1,778,426

UNITED STATES PATENT OFFICE

ARTHUR G. McKEE, OF CLEVELAND, OHIO

GAS SCRUBBER

Application filed March 15, 1926. Serial No. 94,710.

This invention relates to apparatus for treating gases and is concerned more especially with apparatus in which the gases to be treated are passed through liquid in spray form.

The invention also relates to a new and improved gas treating casing or tower in which is provided a substantially straight gas passage free from obstructions to the flow of gas therethrough. It also relates to such a tower provided with means for forming a plurality of zones of liquid spray through which relatively large quantities of gases may flow at a low velocity as compared with gas treating towers in use prior to my invention and with which I am familiar.

My invention further relates to new and improved apparatus for collecting liquid sprayed within a gas treating casing or tower and for returning it to the spraying means by which it may be again converted into spray and which collecting means is so constructed as to offer but slight obstruction to the free passage of gas through the scrubber.

My invention further relates to new and improved means for spraying liquid with minimum lift as it passes from one stage to the next lower one.

My invention still further relates to new and improved pump or runner for elevating liquid through a considerable vertical distance and for spraying it through a plurality of outlets or nozzles at relatively high velocity.

In general, my invention relates to the provision of a gas scrubber and cooler of increased efficiency and capacity and comprising new and improved parts and construction and arrangement of parts.

In the drawings accompanying this application and forming a part thereof—

Fig. 1 is a side elevation, partly in section, of a gas scrubber embodying my invention;

Fig. 2 is an enlarged, central section of a portion of the scrubber shown in Fig. 1;

Fig. 3 is a transverse, sectional view taken substantially on line 3—3 of Fig. 2;

Fig. 6 is a central, sectional view of a modified form of pump or runner embodying my invention;

Fig. 7 is a top plan view of the device of Fig. 6 taken on line 7—7 of that figure; and Fig. 8 is a transverse, sectional view taken on line 8—8 of Fig. 6.

Figure 4:
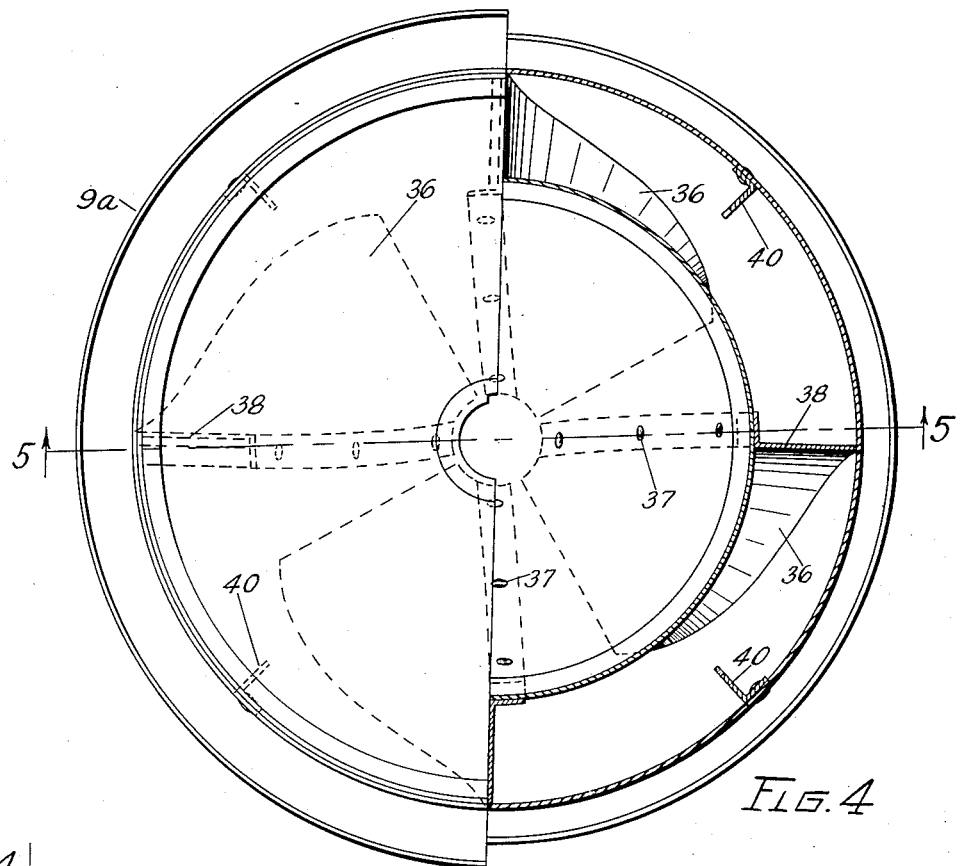
Fig. 4 is a central, sectional view of a pump or runner embodying my invention taken on line 4—4 of Fig. 5, and capable of use in the scrubber of Figs. 1 to 3, inclusive.

Referring first to Figs. 1 to 3, inclusive, the gas scrubber 1 as shown as consisting of a casing having side walls 2 and provided with gas inlet openings 3 near the bottom thereof and a gas outlet opening 4 at the top thereof. Work passages 5 extend from the outside of the casing 2 to beyond the center of the scrubber, for a purpose presently to be described, and preferably extend entirely through the casing so as to have open ends. These work passages 5 are formed by a cross wall 6 which may be considered the floor of the passage, upright walls 7 constituting the side walls of the passage, and a cross wall 8 which may be considered the top wall of the passage. These passages permit workmen to have access to the driving mechanism of the scrubber at various levels for removing, replacing and maintaining the working parts disposed within the passages. Each work passage 5 preferably gives access to two devices employed to form liquid spray within the scrubber. In the floor 6 of each work passage 5 a hole is formed large enough to permit the passage therethrough and securing therein of a spray forming device such as a runner or pump 9, which pump is rotatably suspended from and supported by a housing 10 and floor 6. The pump 9 is here shown as being directly connected to a shaft 11 carried by the housing 10 and fitted at its upper end with a gear 12 which meshes with a pinion 13 carried by a shaft 14 which is actuated by a motor 15. By disconnecting the shaft 14 from the motor 15, the housing 10 may be lifted, carrying with it the pump 9 out of the scrubber and into the work passage 5 for repair or replacement. In the top wall of each work passage 5 I provide a similar opening to permit the removal of a pump 9 similar in substantially all respects to the pump 9 just referred to. This opening is fitted with a housing 16 which supports the pump 9 within the casing and a shaft 17 connected thereto, and likewise carries a gear (not shown), similar to the gear 12, and meshing with a pinion similar to pinion 13 which pinion is connected to a shaft 18 and rotated preferably by a motor 15 suspended from the top wall 8. It will be noted that the pump 9 with its associated parts can be removed from the interior of the casing by removal of the housing 16. In this manner each work passage 5 gives access to the interior of the scrubber above and below the passage and permits removal of a plurality of spray forming devices from the scrubber. When a pump 9 is removed into a work passage the hole through which it was removed is closed by any suitable cover thus permitting the scrubber to continue in operation without loss of liquid or gas.

A liquid holding receptacle 19, which is preferably only a little wider than the diameter of the pump 9, is disposed closely adjacent to the bottom of the pump 9 so that liquid in the receptacle will be in contact with the lower end of the pump 9 at all times whether the pump is at rest or in motion. The pump 9 serves to elevate liquid from the receptacle 19 and to spray it outwardly toward the side walls 2 of the casing. An important part of my invention resides in the construction of spray forming devices, such as pump 9, which will give to the liquid being sprayed sufficient velocity to carry the liquid through the gases flowing in the casing and to the side walls 2. Spray forming devices as just referred to will be described more in detail presently.

I provide along the walls 2 of the casing a plurality of troughs 20, preferably one for each spray forming device 9. These troughs may conveniently consist of a bottom wall 21, an inside wall 22 and an outside wall which, as shown, is a part of the side wall 2 of the casing, each trough thus being disposed to receive liquid flowing down walls 2. Each trough is so disposed with respect to its spray-forming device 9 that it will collect a major part of the liquid sprayed against the casing thereby. Means for returning liquid collected by the troughs 20 to the receptacles 19 are indicated at 24 and consist of a level or inclined bottom wall 25 and upstanding side walls 26. These troughs 20 and 24 and passages 5 are relatively narrow as compared with the diameter of the casing, as will be noted by referring to Figs. 1 to 3, and thus leave relatively large, substantially circular open spaces between the receptacle 19 and the inner side wall 21 of the troughs. At the portions of the scrubber where the gases pass the work passages, the gas channel becomes two substantially semicircular spaces 23, one on each side thereof. Gases in quantity may flow through these alternately circular and double semi-circular passages 23 substantially without obstruction, at a relatively low velocity due to the large area. Preferably troughs 24 and passages 23 are aligned so that the passages extend substantially straight and longitudinally of the casing, that is, so that troughs 24 and passages 23 are situated one above the other and in the same direction from the center.

As shown herein, the spray-forming devices 9 are arranged in pairs relatively close to each other and most of the liquid sprayed outwardly by the upper one of these devices will be collected in one or the other of the two adjacent troughs 20. Liquid sprayed by the lower one of the two devices 9 and lacking sufficient elevation to be collected in its trough will, for the most part, be caught by the next lower trough. Liquid which is not collected by any of the troughs will flow downwardly within the casing coming into contact with the uprising gases and eventually be collected in the bottom of the casing on a bottom wall 27 provided with a suitable outlet 28 through which the liquid and solid materials collected thereby may be removed from the scrubber.

Each receptacle 19 immediately below a work passage is provided with means for conducting liquid therefrom to the next lower receptacle. This means as shown comprises short conduits 29 extending from one pan 19 to the top of pump 9 or pan 19 therebeneath and serves to deliver water to the top of the pump. The pipes 29 are used preferably between the closely adjacent pairs of pumps 9. Pipes 30, similar to pipes 29 except that they are longer, connect a pan or receptacle 19 immediately above a work passage 5 with the pump 9 disposed just below the same work passage. By means of these pipes 29 and 30 liquid may be carried from the top of the scrubber to the bottom of the scrubber through the successive pans 19, as desired. It is, of course, sprayed from each pan 19 to its trough 20 and returned by it to its pan 19 in volume as determined by the capacity of the pump 9 and the quantity of water passing therethrough.

Means are provided for bringing fresh liquid to be sprayed into the upper parts of the scrubber. In Fig. 2 such means comprises pipes 31 and 32 which lead in through the walls 2 of the casing and extend downwardly so as to deliver liquid onto the top of pumps 9, whence it is sprayed to the troughs 20 by the pumps and thence flows into pans 19. The liquid brought onto the top of pumps 9 whether by pipes 29, 30, 31, or 32 is sprayed outwardly above the liquid spray from receptacle 19 thus requiring less energy than when it is elevated from the receptacle to the same height thereabove and also bringing the fresh liquid into contact with the gases after the repeatedly sprayed liquid of receptacle 19 has passed therethrough, thus more effectively cooling the gases by providing more steps or stages of cooling.

Figure 5:
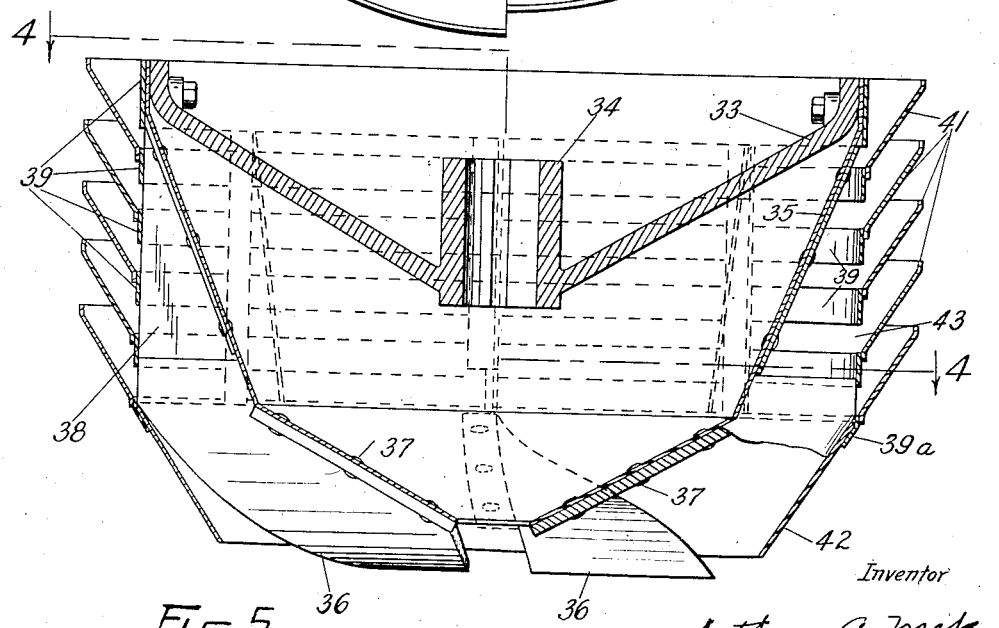
Fig. 5 is a transverse, sectional view of the device of Fig. 4 taken on line 5—5 of that figure.

Referring now to Figs. 4 and 5, which are enlarged detail views of a pump $9^a$ similar in many respects to pump 9 shown in Figs. 1 to 3, the pump or runner $9^a$ comprises a number of parts secured together as by riveting or bolting to form a unitary device. It includes a conically shaped member 33, preferably a casting, having substantially cylindrical edges and a centrally disposed hub portion 34 to receive and to be keyed to a shaft. An angular cup shaped sheet metal member is secured to the outer edges of the cone member 33 and extends downwardly therebeneath. This cup shaped member 35 may be provided with an opening in its lower portion to give access to the end of the drive shaft projecting through the hub 34 and to permit any liquid to escape from the interior of the member 35. A plurality of helically formed vanes or runners is attached to the bottom surface of the member 35, as by rivets 37, and join at their upper ends with substantially vertical radial deflectors 38, which are preferably secured to and arranged to extend radially outward from the member 35. A plurality of cylindrical rings 39 is disposed outside of the member 35 and held in spaced assembled relation by means including the angle irons 40, the top ring 39 preferably being secured to the cup shaped member 35 and casting 33 at the upper edge of the latter. The rings 39 are provided with sheet metal members 41 shaped in the form of truncated cones which are secured to the rings 39 near their upper edges. The lowermost ring, corresponding to ring 39 and designated by $39^a$, is extended inwardly in the form of a truncated cone 42 which engages with the outer edges of the vanes 36 and may stop short of the lower end of the vanes, thereby leaving the lower end of the vanes or runner exposed.

When the pump or runner $9^a$ of Figs. 4 and 5 is assembled with a shaft (not shown) to be rotated by the same and is suspended so that the lower end thereof, including the runners or vanes 36 and the cone shaped member 42, extends into a body of water or other liquid and is rotated in a clockwise direction the liquid will be carried up along the member 42 and runners 36 and delivered to the members 38 which will discharge the liquid outwardly through the openings 43 between the several rings 39 at substantially the velocity or peripheral speed of the cylindrical part of the runner itself. After passing through the opening 43 the liquid so discharged will pass along the upper surfaces of the truncated cones 41 and be delivered upwardly and outwardly at a high velocity and in the form of a more or less finely divided spray.

The device $9^a$ thus resembles a centrifugal runner or pump in certain respects but also lifts the liquid and discharges it upwardly and outwardly through a plurality of openings or nozzles.

It will be understood that liquid delivered to the top of member 33 will be sprayed upwardly and outwardly therefrom when the device $9^a$ of Figs. 6, 7 and 8 is rotated.

Referring now to Figs. 6, 7 and 8, wherein I have illustrated another form of liquid spraying device embodying my invention, 50 designates a cross wall having an upwardly and outwardly inclined marginal flange 51 and a downwardly extending marginal flange 52. The wall 50 is also provided with a hub 53 perforated to receive a suitable drive shaft. A plurality of annular members 54 is assembled above and below the cross wall 50. Each member 54 preferably consists of a substantially cylindrical shell 55 having at its upper edge an upwardly and outwardly inclined flange 56. Each of these members 54 may be provided with integral bosses 57 which serve to space the members apart from each other the desired distance, or other suitable spacing means may be employed as desired. Securing means, such as bolts 58, pass through the lugs 57 and the cross wall 50 and retain the parts in assembled position. These bolts 58 also secure a plate in the form of a truncated, inverted, hollow cone 59 above the top most member 54 and also carry a somewhat similarly shaped but more sharply inclined member 60 beneath the lower most member 54. Curved members 61, which may be formed integral with the cross wall 50, or otherwise attached thereto, extend upwardly from the cross wall 50 and outwardly into substantial engagement with the inner sides of the cylindrical parts 55 of the adjacent members 54. Below the cross wall 50 a plurality of helically shaped members or vanes 62 extend from below the edge of the member 60 in substantial contact with the inner surfaces of the members 60 and 54 and part or all of the way up to the underside of the cross wall 50. When they extend only part way they curve into vertical radial vanes extending up to 50 as shown. When the device of Figs. 6, 7 and 8 is positioned so that the lower ends of members 60 and 62 dip into liquid to be sprayed and is then revolved, liquid is elevated along the members 60 and 62 and delivered to the inclined surfaces of members 60 and 54 and thrown outwardly thereby with considerable velocity. Similarly liquid being delivered on the cross wall 50 at the same time is raised by members 61 and delivered to the upwardly inclined surfaces of the members 54 and similarly sprayed outwardly at considerable velocity.

Having thus described my invention so that those skilled in the art may practice the same, what I desire to secure by Letters Patent is defined in what is claimed, it being understood that changes and alterations falling within the spirit of my invention and not involving invention may be made by those skilled in the art.

What is claimed is:

1. A gas treating tower characterized by having gas passages through which the gas to be treated may flow substantially without obstruction comprising a casing, an annular trough within and adjacent to the side wall of the casing, a liquid holding receptacle within the casing, means for spraying liquid from the receptacle to the inner walls of the casing above the trough, and means extending from said trough to said receptacle for returning substantially all the liquid sprayed from the trough to the receptacle.

2. A gas treating tower characterized by having gas passages through which the gas to be treated may flow substantially without obstruction comprising a casing, a water collecting trough within the casing the outer wall of which trough is formed by the side walls of the casing, a liquid holding receptacle within the casing, means for spraying liquid from the receptacle to the wall of the casing, and a trough extending from the first said trough to said receptacle for conducting liquid from the first said trough to the said receptacle.

3. A gas treating tower characterized by having gas passages through which the gas to be treated may flow substantially without obstruction comprising a casing, an annular trough disposed to collect liquid flowing on the side walls of the casing, a liquid holding receptacle within the casing, means for spraying liquid from the receptacle to the walls of the casing, and liquid carrying means for conducting substantially all the liquid striking said walls from the annular trough to the receptacle.

4. A gas treating tower characterized by having gas passages through which the gas to be treated may flow substantially without obstruction comprising a casing, an annular trough disposed adjacent to the side walls of the casing, a liquid holding receptacle spaced apart from the said trough, means for spraying liquid to the inner walls of the casing and a trough connecting the annular trough to the said receptacle and adapted to return substantially all the liquid sprayed to said receptacle.

5. A gas treating tower characterized by having gas passages through which the gas to be treated may flow substantially without obstruction comprising a casing through which gases may flow and provided with a gas inlet opening near one end and a gas outlet opening near the other end, an annular trough disposed in position to receive liquid flowing down the side walls of the casing, a liquid holding receptacle of relatively small dimensions as compared with the diameter of the casing and separated from the trough by a relatively wide, open space through which gases may flow, means for spraying liquid from the receptacle across the open space to the side walls of the casing and means extending from said trough to said receptacle for returning substantially all the liquid flowing down from said walls from the trough to the receptacle.

6. Gas treating apparatus comprising a casing through which gases may flow and having a gas inlet opening near one end and a gas outlet opening near the other end, a plurality of annular troughs spaced apart from each other vertically and disposed in liquid receiving position with respect to the side walls of the casing, a plurality of aligned liquid receiving receptacles within the casing and each separated from the respective annular troughs by wide, open spaces through which gases may flow, the said spaces being in substantial alignment longitudinally of the casing, means for spraying liquid from the said receptacles across the spaces to the side walls of the casing, and troughs aligned longitudinally of the casing for conducting substantially all the liquid sprayed against said side walls from the annular troughs to the respective receptacles.

7. Gas treating apparatus comprising a casing, a plurality of means within the casing for spraying liquid through gases in the casing, a work passage extending transversely of the casing and disposed between two of said spray forming means, and means in the work passage for actuating the two said spray forming means, certain of the said work passages having controllably closed openings for permitting access to the two spray forming means adjacent thereto.

8. Gas treating apparatus comprising a casing, a plurality of means within the casing for spraying liquid transversely of the casing and through gases therein, means for returning sprayed liquid from the side walls of the casing to the said means, and a plurality of work passages extending transversely of the casing each having an open end, the said work passages being disposed between pairs of the said spray forming means, two of the said spray forming means being accessible from each of certain of the work passages.

9. Gas treating apparatus comprising a casing, a liquid holding receptacle within the casing, a spray forming device having two vertically separated spray forming portions, one of the said portions extending into liquid in the said receptacle, and having a liquid confining space from which substantially all gas is excluded when the device is rotating, the said space having therein means for lifting and spraying outwardly therefrom liquid from the receptacle when the device is rotating, means for conducting liquid to be sprayed into the other said portion, and means for returning liquid sprayed by both said portions to the receptacle.

10. Gas treating apparatus comprising a casing, a plurality of liquid holding receptacles vertically spaced from each other within the casing, a spray forming device associated with each of the said receptacles, certain of the said devices comprising two separated spray forming portions, one superimposed above the other, the lower of the said portions extending into liquid in the receptacle, and having a liquid confining space from which substantially all gas is excluded when the device is rotating, the said space having therein means for lifting and spraying outwardly therefrom liquid from the receptacle when the device is rotating, means for conducting liquid to be sprayed into the superimposed portion, means for conducting liquid sprayed by both said portions to the receptacle, and means for conducting surplus liquid from certain of the receptacles to the said superimposed portion of a spray forming device therebeneath.

In testimony whereof I hereunto affix my signature this 12th day of March, 1926.

ARTHUR G. McKEE.